United States Patent
Bhat et al.

(10) Patent No.: US 12,395,217 B2
(45) Date of Patent: Aug. 19, 2025

(54) METHOD FOR FR1 FDD CHANNEL STATE INFORMATION

(71) Applicant: MEDIATEK INC., Hsin-Chu (TW)

(72) Inventors: Sandeep Bhat, Bengaluru (IN); Chin-Kuo Jao, Hsin-Chu (TW); Jiann-Ching Guey, Hsin-Chu (TW)

(*) Notice: Subject to any disclaimer, the term of this patent is extended or adjusted under 35 U.S.C. 154(b) by 489 days.

(21) Appl. No.: 17/555,437

(22) Filed: Dec. 18, 2021

(65) Prior Publication Data

US 2022/0231740 A1 Jul. 21, 2022

Related U.S. Application Data

(60) Provisional application No. 63/137,777, filed on Jan. 15, 2021.

(30) Foreign Application Priority Data

Jan. 18, 2021 (IN) .............................. 202121002253

(51) Int. Cl.
*H04B 7/06* (2006.01)
*H04J 1/06* (2006.01)
(Continued)

(52) U.S. Cl.
CPC ......... *H04B 7/0626* (2013.01); *H04B 7/0639* (2013.01); *H04J 1/065* (2013.01); *H04L 5/0051* (2013.01); *H04L 5/14* (2013.01)

(58) Field of Classification Search
CPC .. H04B 7/0626; H04B 7/0639; H04B 7/0478; H04J 1/065; H04L 5/0051; H04L 5/14; H04L 1/0026; H04L 25/0224
See application file for complete search history.

(56) References Cited

U.S. PATENT DOCUMENTS

2020/0403679 A1    12/2020  Park .......................... H04B 7/06
2022/0029676 A1*   1/2022   Ramireddy .......... H04B 7/0626
(Continued)

FOREIGN PATENT DOCUMENTS

CN    109757127 A    5/2019

OTHER PUBLICATIONS

Taiwan IPO, office action for the Taiwanese patent application 111100886 (no English translation is available), dated Aug. 29, 2022 (7 pages).

(Continued)

*Primary Examiner* — Habte Mered
(74) *Attorney, Agent, or Firm* — Helen Mao; Zheng Jin; Imperium Patent Works

(57) ABSTRACT

A method of downlink channel state information (DL CSI) measurement and reporting is proposed in FR1 frequency division duplex (FDD) systems. CSI reference signal (CSI-RS) is directed towards dominant spatial domain (SD, beam) and frequency domain (FD, delay) components in the propagation environment. By partial channel reciprocity, angles and delays in the DL channel can be obtained by UL channel measurement. UE only needs to measure and feedback the DL CSI corresponding to the dominant angles and delays. BS obtains the precoder in the antenna-frequency domain using the CSI feedback in the beam-delay domain. BS uses the precoder for transmission over Physical downlink shared channel (PDSCH). In one embodiment, UE reconstructs the DL channel on a multitude of delays using the DL channel estimated on a few beamformed CSI-RS and delay tap indices signaled from the network.

18 Claims, 4 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 2022/0286176 A1* | 9/2022 | Grossmann | H04L 5/0048 |
| 2022/0286257 A1* | 9/2022 | Wu | H04B 7/0478 |
| 2023/0261832 A1* | 8/2023 | Rupasinghe | H04B 7/088 |
| | | | 370/329 |
| 2023/0412225 A1* | 12/2023 | Tosato | H04B 7/0658 |
| 2024/0007164 A1* | 1/2024 | Zhang | H04B 7/0478 |
| 2024/0063854 A1* | 2/2024 | Athley | H04L 5/0023 |
| 2024/0088954 A1* | 3/2024 | Athley | H04B 7/0621 |

OTHER PUBLICATIONS

Catt, "CSI enhancements for MTRP and FR1 FDD with partial reciprocity", 3GPP TSG RAN WG1 Meeting #103-e, R1-2007830, pp. 1-5, dated Oct. 26-Nov. 13, 2020 (10 pages).

Chinese IP office written opinion for related patent application 202210057606.3 (no English translation is available), dated May 26, 2023 (6 pages).

* cited by examiner

METHOD FOR FR1 FDD CHANNEL STATE INFORMATION

CROSS REFERENCE TO RELATED APPLICATIONS

This application claims priority under 35 U.S.C. § 119 from Chinese Application Number 202121002253, entitled "Method for FR1 FDD CSI," filed on Jan. 18, 2021, the subject matter of which is incorporated herein by reference.

TECHNICAL FIELD

The disclosed embodiments relate generally to mobile communication networks, and, more particularly, to methods for improving channel state information (CSI) estimation performance in FR1 FDD systems.

BACKGROUND

Fifth generation new radio (5G NR) is an improved radio access technology (RAT) that provides higher data rate, higher reliability, lower latency and improved system capacity. In NR systems, the terrestrial radio access network includes a plurality of base stations (BS), referred as next generation Node-Bs (gNBs), communicating with a plurality of mobile stations, referred as user equipment (UE). A UE may communicate with a base station or a gNB via the downlink and uplink. The downlink (DL) refers to the communication from the base station to the UE. The uplink (UL) refers to the communication from the UE to the base station. The 5G NR standard is developed by 3GPP.

In Frequency division duplex (FDD) systems, downlink channel state information (CSI) feedback overhead usually increases with the number of transmit antenna elements (spatial domain, SD) and channel bandwidth (frequency domain, FD). To mitigate the overhead, a method of downlink channel measurement and reporting is desired, where it is possible to direct the CSI reference signal (CSI-RS) towards dominant SD and FD components in the propagation environment. In abstract terms, an SD basis vector represents an angle (of arrival/departure) and an FD basis vector represents a delay tap. Physically, the above process is equivalent to beamforming the CSI-RS towards a scatterer in the environment, where a scatter is associated with an angle and a delay. By partial channel reciprocity, angles and delays in the DL channel can be obtained by UL channel measurement. Once this is done, the UE only needs to measure and feedback the downlink CSI corresponding to the dominant angles and delays.

For good throughput performance, it is desired to capture a large number of dominant angles and delays, which leads to a large number of beamformed CSI-RS ports for channel estimation. Large number of dominant angles, increases the spatial domain resolution of the channel, and in turn improves the MIMO performance. Large number of dominant delays increases the frequency domain resolution of channel, and in turn improves the frequency domain resource allocation performance. However, large number of beamformed CSI-RS ports increase CSI-RS overhead. New CSI mechanisms are desired with good resolution both in SD and FD while maintaining reasonable CSI-RS overhead and CSI feedback overhead.

SUMMARY

A method of downlink channel state information (DL CSI) measurement and reporting is proposed in FR1 (frequency range 1, as specified in 5G NR) frequency division duplex (FDD) systems. CSI reference signal (CSI-RS) is directed towards dominant spatial domain (SD/beam) and frequency domain (FD/delay) components in the propagation environment. By partial channel reciprocity, angles and delays in the DL channel can be obtained by UL channel measurement. UE only needs to measure and feedback the DL CSI corresponding to the dominant angles and delays. The feedback is in terms of a precoder matrix (precoding matrix indicator, PMI) in the beam-delay domain. BS reconstructs the precoder in the antenna-frequency domain using the CSI feedback in the beam-delay domain. BS uses this reconstructed precoder for transmission over Physical downlink shared channel (PDSCH). To improve the frequency domain resolution, UE reconstructs the DL channel on a multitude of delays using the DL channel estimated on a few beamformed CSI-RS ports and delay tap indices signaled from the network. Further, to reduce CSI-RS overhead, UE measures and reports CSI (PMI, channel quality indicator (CQI), for example) for subsets of the signaling bandwidth of the DL channel.

In one embodiment, a UE transmits sounding reference signal (SRS) to a base station (BS) over an uplink (UL) channel in a frequency division duplex (FDD) network. The UE receives channel state information reference signals (CSI-RS) over a downlink (DL) channel. CSI-RS ports for CSI-RS transmission are mapped to corresponding BS transmit antennas by a precoding matrix $W_D$ derived from the SRS. The UE receives one or more frequency domain basis indices from the BS. The UE estimates CSI of the DL channel using the received frequency domain basis indices information and the precoded CSI-RS. The UE reports the estimated CSI to the BS for subsequent DL transmission. The estimated CSI comprises a rank indicator (RI), a precoding matrix indicator (PMI), and a channel quality indicator (CQI).

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
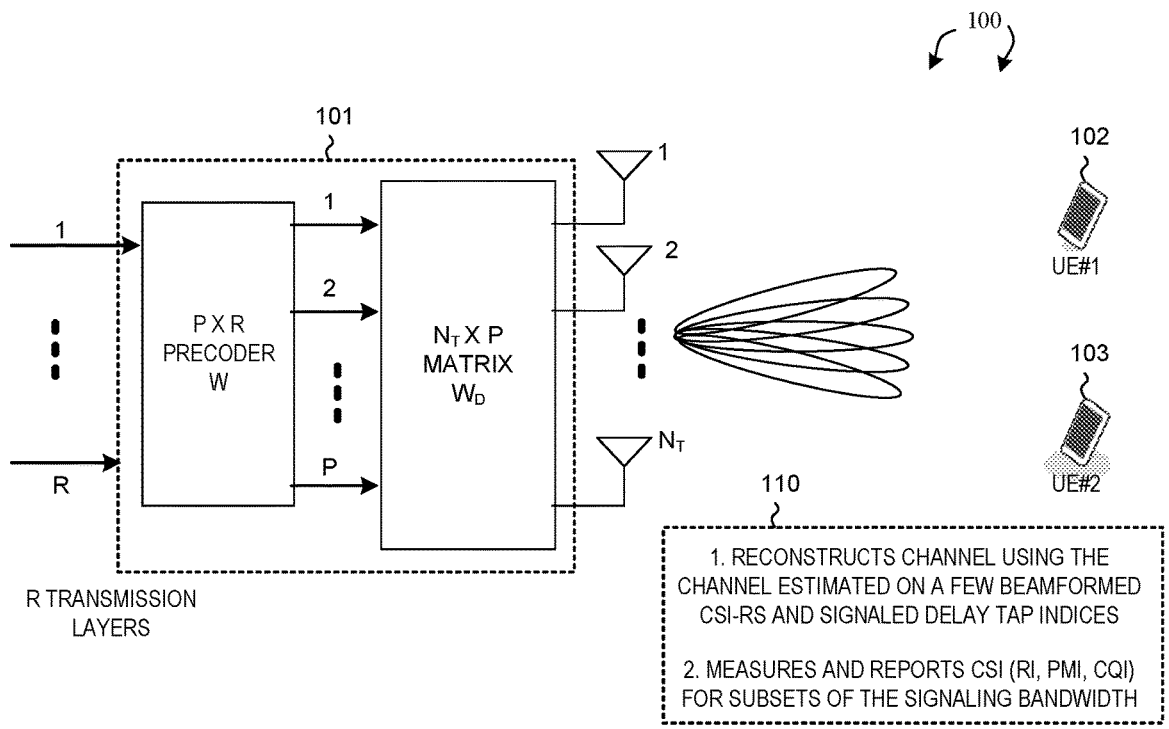
FIG. 1 illustrates a mobile communication network with CSI-RS beamforming for CSI acquisition and reporting with reduced overhead in accordance with one novel aspect. Also illustrated is a precoder for data transmission after CSI acquisition is done in accordance with one novel aspect.

FIG. 1 illustrates a mobile communication network with CSI-RS beamforming for CSI acquisition and reporting with reduced overhead in accordance with one novel aspect. Mobile communication network 100 is an OFDM network comprising a serving base station gNB 101, a first user equipment 102 (UE #1), and a second user equipment 103 (UE #2). In 3GPP NR system based on OFDMA downlink, the radio resource is partitioned into subframes in time domain, each subframe is comprised of a number of OFDM symbols. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of twelve consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in NR, while the Physical Downlink Control Channel (PDCCH) is used to carry downlink control information (DCI). The control information may include scheduling decision, information related to reference signal information, rules forming the corresponding transport block (TB) to be carried by PDSCH, and power control command. For reference signals, Channel State Information reference signals (CSI-RS) are utilized by UEs to measure and feedback the characteristics of a radio channel so that the BS can use correct modulation, code rate, beam forming, etc. for DL data transmission.

In multiple-input and multiple-output (MIMO) system with $N_T$ transmitter antennas and $N_R$ receiver antennas, the input-output relationship can be described as y=HWx+n, where y, x, n are the vectors of the received symbols, the transmitted symbols, and noise, H is the ($N_R \times N_T$) matrix of channel coefficients, and W is the precoding matrix. A precoding matrix is used on the transmit symbols to enhance performance. Consider a MIMO channel which models the downlink of the cellular mobile communication system 100 of FIG. 1. BS 101 is equipped with $N_T$ transmit antennas, and UEs (e.g., UE #1 and UE #2) have NR receive antennas each. At a time-frequency resource element, BS 101 performs multiple antenna transmission to UEs by precoding matrix W. This precoding matrix is obtained by UE feedback after measurement of CSI-RS. In addition to a precoding matrix, NR allows a beamforming matrix $W_D$ to further enhance performance and/or reduce feedback overhead. In such a case, the precoding matrix W first maps R transmission layers/streams into P antenna ports, and the beamforming matrix $W_D$ further maps a P port CSI-RS into $N_T$ transmit antennas. In the embodiments of the invention, the gNB uses angle (spatial domain, SD) and delay (frequency domain, FD) reciprocity in the channel to derive the beamforming matrix $W_D$.

In Frequency division duplex (FDD) systems, downlink channel state information (CSI) feedback overhead usually increases with the number of transmit antenna elements (spatial domain, SD) and channel bandwidth (frequency domain, FD). To mitigate the overhead, a method of downlink channel measurement and reporting is desired, where it is possible to direct the CSI reference signal (CSI-RS) towards dominant SD and FD components in the propagation environment. In abstract terms, an SD basis vector represents an angle (of arrival/departure) and an FD basis vector represents a delay tap. Physically, the above process is equivalent to beamforming the CSI-RS towards a scatterer in the environment, where a scatter is associated with an angle and a delay. By partial channel reciprocity, angles and delays in the DL channel can be obtained by UL channel measurement. Once this is done, the UE only needs to measure and feedback the downlink CSI corresponding to the dominant angles and delays.

For good throughput performance, it is desired to capture a large number of dominant angles and delays, which leads to a large number of beamformed CSI-RS ports for channel estimation. Large number of dominant angles, increases the spatial domain resolution of the channel, and in turn improves the MIMO performance. Large number of dominant delays increases the frequency domain resolution of channel, and in turn improves the frequency domain resource allocation performance. However, large number of beamformed CSI-RS ports increase CSI-RS overhead. In accordance with one novel aspect, as depicted by 110 in FIG. 1, CSI measurement and reporting are proposed with good resolution both in SD and FD while maintaining reasonable CSI-RS overhead and CSI feedback overhead. In one embodiment, UE reconstructs the DL channel on a multitude of delays using the DL channel estimated on a few beamformed CSI-RS ports and delay tap indices signaled from the network. In another embodiment, UE measures and reports CSI (PMI, CQI) for subsets of the signaling bandwidth of the DL channel.

Figure 2:
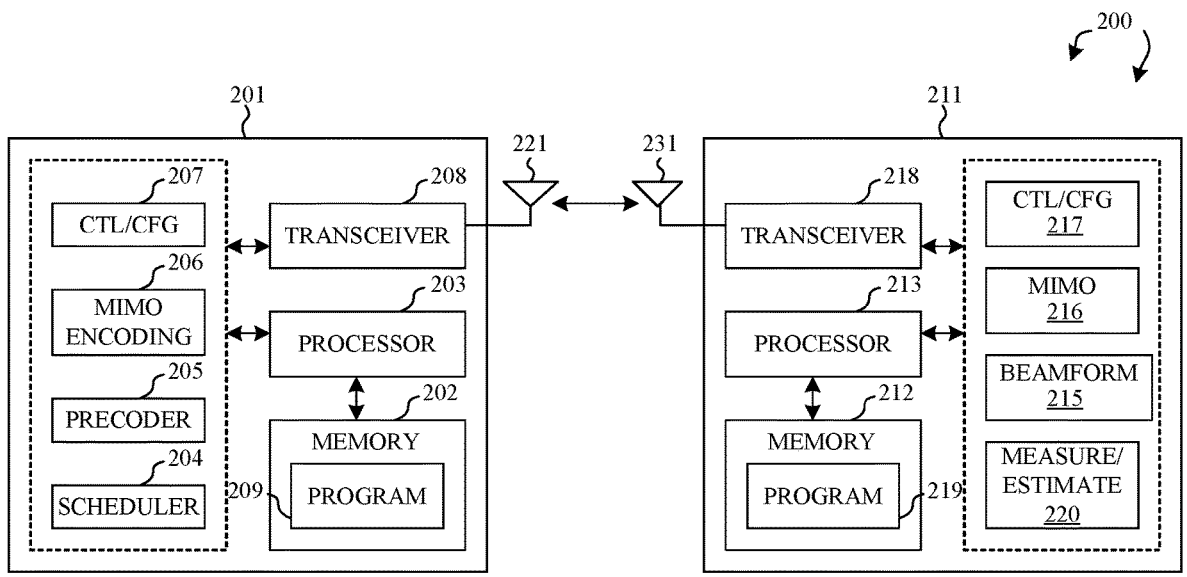
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), precode (via precoder 205), encode (via MIMO encoding circuit 206), and transmit control/config information and data (via control/config circuit 207) to UE 211, and allow UE 211 to receive, decode (via MIMO circuit 216), and beamform (via beamforming circuit 215) the control/config information and data (via control/config circuit 217) and performs channel estimation (via measurement/estimation circuit 220) accordingly. CSI estimation and reporting mechanisms are proposed with good resolution both in SD and FD while maintaining reasonable CSI-RS overhead and CSI feedback overhead. In one example, UE reconstructs the DL channel on a multitude of delays using the DL channel estimated on a few beamformed CSI-RS and delay tap indices signaled from the network. In another example, UE measures and reports CSI (PMI, CQI) for subsets of the signaling bandwidth of the DL channel.

For a transmitter with $N_T$ transmit antenna ports, in OFDM systems, $N_T$ CSI-RS ports are time/frequency/code multiplexed inside a resource block, with one port occupying one resource element (one OFDM symbol×one subcarrier). Using these $N_T$ CSI-RS ports, channel estimation can be performed by the UE in 'antenna' domain. However, channel estimation can be also performed in beam (angle) domain. Note that the channel may be compact in the beam domain, even while it may be rich in the antenna domain. Beam (angle) domain can be obtained from the antenna domain by a linear transformation (e.g. DFT/SVD transformation (DFT beams/SVD beams respectively)):

$$H^b = H U_{SD}$$

Where
$H=[h_1 \ h_2 \ \ldots \ h_{N_T}]$ is the $N_R \times N_T$ DL channel matrix,
$H^b=[h_1^b \ h_2^b \ \ldots \ h_{N_T}^b]$ is the $N_R \times N_T$ DL channel matrix in the beam domain,
$U_{SD}=[s_1 \ s_2 \ \ldots \ s_{N_T}]$ is the $N_T \times N_T$ matrix representing the antenna to beam (angle) domain transformation. $s_t$ is a $N_T \times 1$ DFT/SVD vector.

Suppose the transmitter has knowledge that two beams— namely $s_i$ and $s_j$ are dominant in the (downlink) channel. To estimate the downlink beam domain channel $h_i^b$ and $h_j^b$, the transmitter transmits the reference signal vectors $s_i$ and $s_j$ in the first and second CSI-RS port respectively. The two CSI-RS ports can be two orthogonal time instances or two orthogonal subcarriers or two orthogonal codes or a combination of time/frequency/code. The channel estimation process can be represented as:

$$[y_1 \ y_2] = [h_1 \ h_2 \ \ldots \ h_{N_T}][s_i \ s_j] + [z_1 \ z_2]$$

$$[y_1 \ y_2] = [h_1 \ h_2 \ \ldots \ h_{N_T}][s_i \ s_j]\begin{bmatrix}1 & 0\\ 0 & 1\end{bmatrix} + [z_1 \ z_2]$$

This formulation is the origin of the term 'precoded/beamformed CSI-RS', since the original two port CSI-RS in the time/frequency/code domain is 'precoded' by the $N_T \times 2$ matrix $W_{SD}=[s_i \ s_j]$. With this precoded CSI-RS, it is equivalent that the receiver measures the $N_R \times 2$ effective channel $HW_{SD}$. With the knowledge of dominant beams, the CSI-RS port count with 'precoded' CSI-RS is reduced from $N_T$ to two. In a cellular environment with one BS and multiple UEs in each cell, with the conventional CSI-RS, every UE can use the same CSI-RS to estimate it's downlink channel (cell specific CSI-RS). With precoded CSI-RS however, since the dominant beams can be potentially different for every UE, the CSI-RS port count at the BS transmitter scales with the number of UEs (UE specific CSI-RS). By configuring the UE to measure and report the DL channel only in the dominant beams, much of computation and reporting can be avoided. The BS can obtain knowledge of the dominant DL beams from the UL channel based on UL/DL channel reciprocity.

For the future standards of 5G NR, it is intended to exploit the channel delay domain, apart from beam domain, to further reduce the DL CSI computation and overhead. This is based on the fact that the channel may be compact in the delay domain, even while it may be rich in the frequency domain. The frequency and delay domain are related by the DFT transformation. By configuring the UE to measure and report the DL channel only in the dominant delay taps, much of computation and reporting can be avoided. The BS can obtain knowledge of the dominant DL delay taps from the UL channel based on the fact that there is UL/DL reciprocity in the delay domain.

Figure 3:
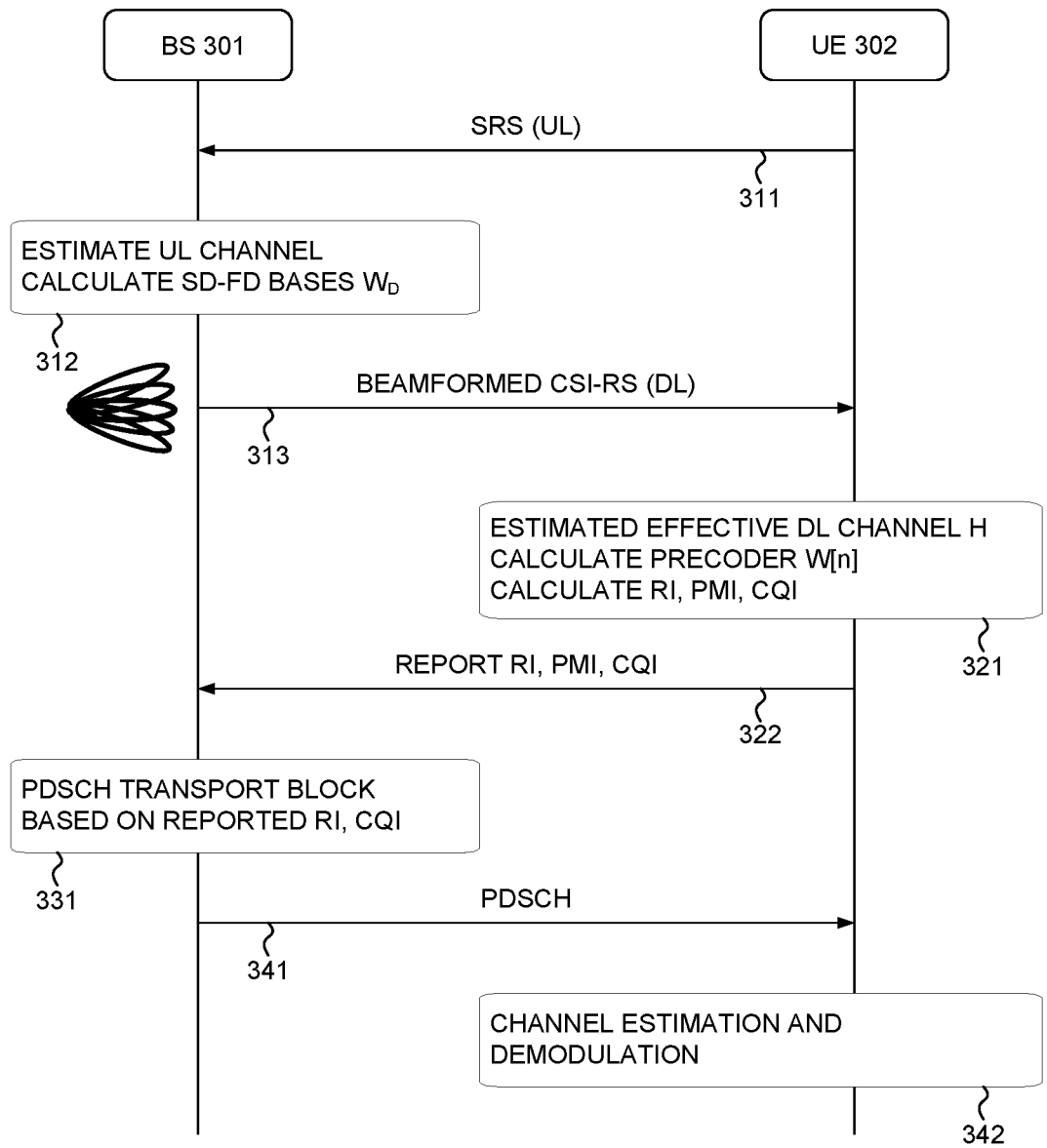
FIG. 3 illustrates a sequence flow of an overall procedure for CSI acquisition and reporting in accordance with one novel aspect.

FIG. 3 illustrates a sequence flow of an overall procedure for CSI acquisition and reporting in accordance with one novel aspect. In step 311, UE 302 transmits uplink sounding reference signal (UL SRS) to its serving base station BS 301. In step 312, BS 301 estimates the UL channel $H^{UL}$ and the BS uses both angle (spatial domain, SD) and delay (frequency domain, FD) reciprocity in the channel to derive the DL SD-FD based beamforming matrix $W_D$. The $N_T \times L$ SD bases matrix $W_{SD}=[s_1 \ \ldots \ s_L]$ and the $N_3 \times M$ FD bases $W_{FD}=[f_1 \ \ldots \ f_M]$ serve as the linear transformations for antenna↔beam domain and frequency↔delay domain respectively. Here, L denotes the number of dominant beams and M denotes the number of dominant beams in the UL/DL channel. $N_3$ is the total number of frequency domain components in the channel. A frequency domain component may refer to be a subcarrier, a resource block or a set of resource blocks. A set of resource blocks is referred to as a subband in 3GPP terminology. The $N_T N_3 \times LM$ joint SD-FD bases matrix is obtained by $W_D = W^*_{FD} \otimes W_{SD}$. In step 313, BS 301 precodes (pre-compensates) CSI-RS by the joint transformation vectors of antenna-to-beam domain and frequency-to-delay domain. This means that an LM port CSI-RS in frequency subband n=0,1, . . . $N_3-1$ is precoded by an $N_T \times LM$ matrix $W_D[n]=[f^*_{n1} \ f^*_{n2} \ \ldots \ f^*_{nM}] \otimes W_{SD}$ and transmitted over $N_T$ antennas. BS 301 transmits the beamformed CSI-RS in the downlink to UE 302. It is seen that the BS 301 has estimated L dominant beams and M dominant delays and used them for CSI-RS precoding. Therefore, UE 302 has to be configured to measure LM beam-delay pairs.

In step 321, UE 302 measures the precoded CSI-RS and estimates the effective DL channel H. With the CSI-RS in subband n precoded using $W_D[n]$, UE measures the effective DL channel $H[n]W_D[n]$ of dimension $N_R \times LM$, where $H[n]$ is the actual DL channel of dimension $N_R \times N_T$ in subband n. The $N_R \times M$ channel in the beam-delay domain is estimated by the UE as $H^{bd}=\Sigma H_{n=0}^{N_3-1} H[n]W_D[n]=[h_{11} \ h_{21} \ \ldots \ h_{L1} \ldots h_{lm} \ldots h_{LM}]$. To compute the precoder (mapping from data streams to beams), the UE now forms M channel matrices, each corresponding to a single delay tap. The $m^{th}$ channel matrix is given by, m=1, . . . , M, $H_m^{bd}=[h_{1m} \ h_{2m} \ \ldots \ h_{Lm}] \in \mathbb{C}^{N_R \times L}$. To compute the precoder on delay m=1, . . . M, UE computes the SVD: $H_m^{bd}=U_m \Sigma_m V_m^H$. The optimal precoder for data transmission is then given by the first $R \leq L$ columns of $V_m$, where R is the rank of the channel $H_m^{bd}$. To compute the precoders on M delay taps, UE needs to compute M SVDs. The M precoders are arranged in a single LM×R wideband (independent of the frequency index n=0,1, ... $N_3-1$) precoder matrix $V^{bd}$ as follows:

$$W = V^{bd} = \begin{bmatrix} V_1 \\ V_2 \\ \vdots \\ V_M \end{bmatrix}$$

where each $V_m$ is a L×R precoder on delay tap m=1, ... M

UE 302 calculates the channel state information in the form of RI, PMI, CQI. In step 322, UE 302 reports the channel state information in the beam-delay domain back to BS 301. The CQI in each frequency subband n=0,1, ... $N_3-1$ is computed as a function of the $N_R \times LM$ DL channel matrix $H[n]W_D[n]$ estimated by the UE in subband n, and the precoder $V^{bd}$. The operation $W_D[n]V^{bd}$ transforms the precoder in the beam-delay domain to the antenna-frequency domain, so that $W_D[n]V^{bd}$ is the $N_T \times R$ precoder for the channel H[n]. The CSI reported back to the BS consists of the following: The LM×R precoding matrix $V^{bd}$; Rank R; and subband CQIs $f(H[n]W_D[n]V^{bd})$, n=0,1, ... $N_3-1$, where f(·) is a function the UE uses to calculate CQI.

In step 331, BS 301 obtains the channel state information in the beam-delay domain by UE feedback, and applies the transformation vectors to get the precoder in the antenna-frequency domain. BS 301 obtains the precoder $V^{bd}$ in the beam-delay domain, and applies the joint antenna-frequency to beam-delay linear transformation $W_D = W^*_{FD} \otimes W_{SD}$ to the precoder $V^{bd}$ to obtain:

$$V = W_D V^{bd} = \begin{bmatrix} W_D[1] \\ W_D[2] \\ \vdots \\ W_D[N_3] \end{bmatrix} V^{bd} = \begin{bmatrix} W_D[1]V^{bd} \\ W_D[2]V^{bd} \\ \vdots \\ W_D[N_3]V^{bd} \end{bmatrix} \in \mathbb{C}^{N_3 N_T \times R}$$

In step 341, BS 301 uses the precoder for data transmission to UE 302 over PDSCH. For PDSCH transmission in subband n, the BS can use $N_T \times R$ precoder $W_D[n]V^{bd}$, Rank R, and, CQI $f(H[n]W_D[n]V^{bd})$ to decide modulation and coding scheme (MCS), transport block size etc. In step 342, UE 302 performs channel estimation and demodulation accordingly.

Figure 4:
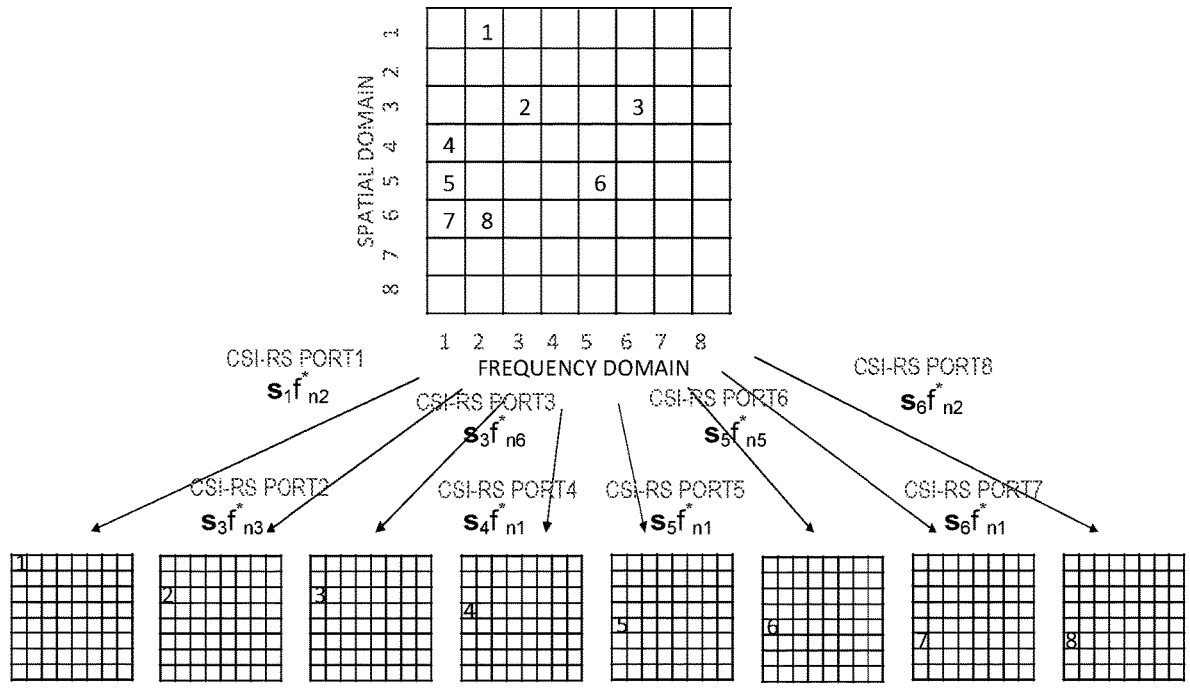
FIG. 4 illustrates uplink channel estimation with dominant beams and delays, and corresponding downlink estimation in beam-delay domain in accordance with one novel aspect.

FIG. 4 illustrates uplink channel estimation with dominant beams and delays, and corresponding downlink estimation in beam-delay domain in accordance with one novel aspect. In the uplink, BS receives SRS from UE and determines dominant SD-FD pairs from UL channel estimate. In the example of FIG. 4, we assume that the BS has further down selected eight beam-delay pairs (or SD-FD pairs) from the LM beam-delay pairs as described previously. The eight (SD,FD) pairs are (1,2), (3,3), (3,6), (4,1), (5,1), (5,5), (6,1), and (6,2). The network uses the dominant SD-FD pairs for beamformed CSI-RS transmission to the UE. UE then measures the beam-delay domain channel:

$$W_D[n] = [s_1 f^*_{n2} \quad s_3 f^*_{n3} \quad \cdots \quad s_6 f^*_{n2}]$$

$$H^{bd} = \sum_{n=0}^{N_3-1} H[n]W_D[n] \in \mathbb{C}^{N_R \times P}$$

Where $N_3$ is the number of PMI subbands (frequency units) in the channel bandwidth.

A single wideband precoder W is computed from the channel $H^{bd}$ as described previously, and reported to the BS. Subband CQIs computed at UE as $f(H[n]W_D[n]W)$. The network then reconstructs the precoder $W_{BS}[n]=W_D[n]W$, n=0,1, ... $N_3-1$. Wideband reporting of PMI reduces frequency dependent PMI overhead. For good throughput performance, it is desired to capture a large number of dominant angles and delays, which leads to a large number of beamformed CSI-RS ports for channel estimation. Accordingly, CSI mechanisms are proposed with good resolution both in SD and FD while maintaining reasonable CSI-RS overhead and CSI feedback overhead.

Figure 5:
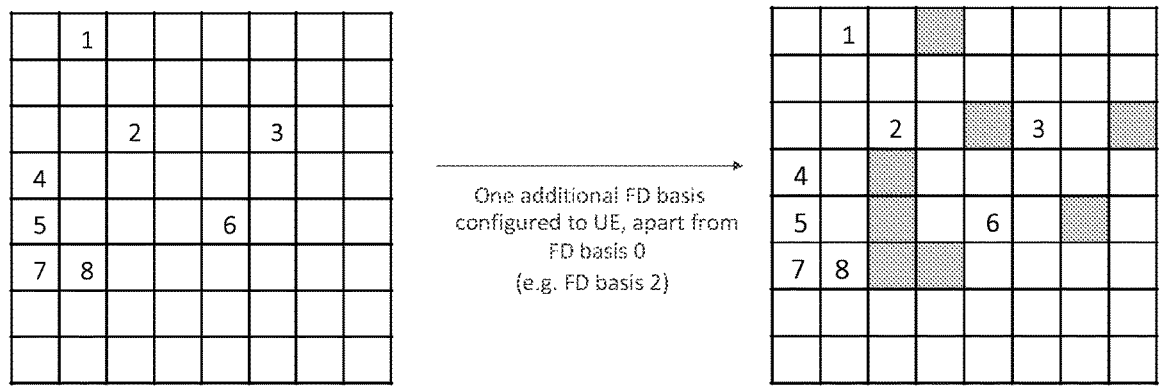
FIG. 5 illustrates a first embodiment of channel reconstruction using the channel estimated on a few beamformed CSI-RS and signaled delay tap indices.

FIG. 5 illustrates one embodiment of channel reconstruction using the channel estimated on a few beamformed CSI-RS and signaled delay tap indices, in accordance with one novel aspect. An FD basis (delay tap) with index m can be represented by a DFT vector $$f_{nm} = e^{j\frac{2\pi}{N_3}mn},$$

n=0, ... $N_3-1$, where $N_3$ is the number of PMI subbands. Another FD basis l≠m can be represented in terms of the first FD basis as $$f_{nl} = e^{j\frac{2\pi}{N}kn} f_{nm},$$

where k=l−m. Based on the uplink channel measurement, when the base station finds two dominant delays in the same beam as m and l, it only suffices to beamform CSI-RS using FD basis m and indicate the offset k=l−m via dynamic signaling to the UE. The dynamic signaling support should depend on the channel profile. For slowly varying channels, it suffices to add signaling bits of the offset via RRC message. MAC-CE or DCI signaling can be enabled for more rapidly varying channels. The indicated offset can be used by the UE to reconstruct the channel on those delays which are not used for beamforming CSI-RS.

In the example of FIG. 5, P=8 CSI-RS ports→8 dominant SD-FD bases determined from UL channel. Apart from FD basis 0, one additional FD basis is configured to UE (e.g., FD basis 2). Effectively 16 SD-FD pairs are measured by UE with P=8 CSI-RS ports and 2 FD basis, 0 and 2. With one additional FD basis $f_m$ configured to the UE apart from $f_0$, the $N_R \times 2P$ effective DL channel constructed by the UE is:

$$\tilde{H}[n] = H[n] \begin{bmatrix} s_{i_1} f^*_{nj_1} & \cdots & s_{i_P} f^*_{nj_P} & s_{i_1} f^*_{nj_1} e^{j\frac{2\pi}{N_3}mn} & \cdots & s_{i_1} f^*_{nj_1} e^{j\frac{2\pi}{N_3}mn} \end{bmatrix}$$

Considering without loss of generality a single layer transmission, UE reports a 2P×1 vector of linear combination coefficients to combine the 2P ports into one transmission layer $$v=[V_{11} \; V_{12} \ldots V_{1P} \; V_{21} \; V_{22} \ldots V_{2P}]^T$$

the $N_T \times 1$ precoder for single layer transmission in subband n is $$W_{BS}[n] = \begin{bmatrix} s_{i_1}f^*_{nj_1} & \cdots & s_{i_p}f^*_{nj_p} & s_{i_1}f^*_{nj_1}e^{j\frac{2\pi}{N_3}mn} & \cdots & s_{i_1}f^*_{nj_1}e^{j\frac{2\pi}{N_3}mn} \end{bmatrix}v$$

This is equivalent to $$W_{BS}[n] = \begin{bmatrix} s_{i_1}f^*_{nj_1} & \cdots & s_{i_p}f^*_{nj_p} \end{bmatrix} \begin{bmatrix} V_{11} & V_{21} \\ \vdots & \vdots \\ V_{1P} & V_{2P} \end{bmatrix} \begin{bmatrix} 1 & e^{-j\frac{2\pi}{N_3}mn} \end{bmatrix}^H$$

$$= W_D[n] \begin{bmatrix} V_{11} & V_{21} \\ \vdots & \vdots \\ V_{1P} & V_{2P} \end{bmatrix} \begin{bmatrix} 1 & e^{-j\frac{2\pi}{N_3}mn} \end{bmatrix}^H,$$

the UE reported part is $$W[n] = \begin{bmatrix} V_{11} & V_{21} \\ \vdots & \vdots \\ V_{1P} & V_{2P} \end{bmatrix} \begin{bmatrix} 1 & e^{-j\frac{2\pi}{N_3}mn} \end{bmatrix}^H$$

and $W_D[n]$ is used by the BS for precoding a P port CSI-RS. Denoting the P×2 linear combination coefficients matrix as $$W_2 = \begin{bmatrix} V_{11} & V_{21} \\ \vdots & \vdots \\ V_{1P} & V_{2P} \end{bmatrix}$$

and the $N_3 \times 2$ FD bases matrix as $W_f = [f_0\ f_m]$, the UE reported precoder over all subbands can be written as $W = W_1 W_2 W_f^H$, where $W_1$ is a P×P identity matrix.

The above embodiment can be applied for codebook based precoding supported in 5G NR standards. It has been agreed in 5G NR standards that for port selection (PS) codebook enhancements utilizing DL/UL reciprocity of angle and/or delay, codebook structure $W = W_1 W_2 W_f^H$ is supported, where $W_1$ is a free selection matrix, with identity matrix as special configuration, $W_f \in \mathbb{C}^{N_3 \times M}$ is a DFT based compression matrix in which $N_3 = N_{CQIsubband} \times R$ is the number of PMI subbands and M represents the number of frequency domain basis vectors, $M \in \{1,2\}$ are supported. When M=2, the FD bases used for $W_f$ quantitation are limited within a single window of size N configured to the UE via RRC parameter valueOfN. FD bases in the window are consecutive from an orthogonal DFT matrix.

Figure 6:
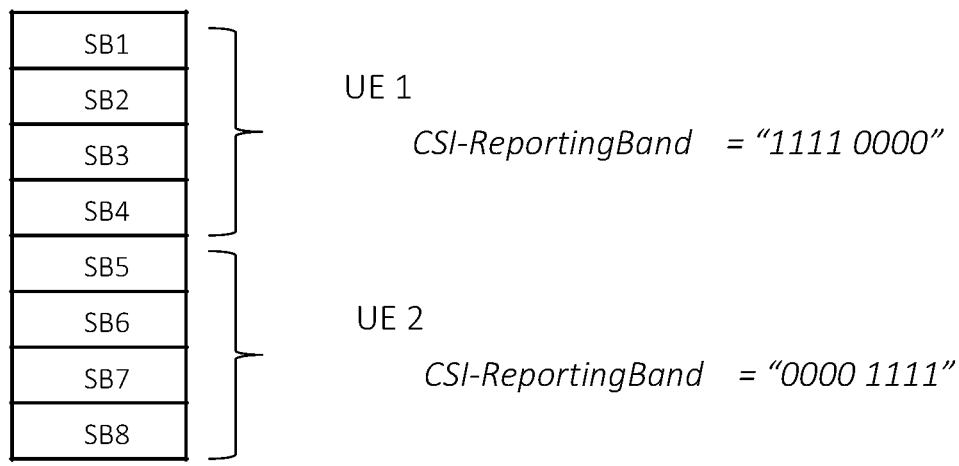
FIG. 6 illustrates a second embodiment of measuring and reporting channel state information (PMI, CQI) subsets of the signaling bandwidth.

FIG. 6 illustrates one embodiment of measuring and reporting channel state information (PMI, CQI, for example) subsets of the signaling bandwidth, in accordance with one novel aspect. The FD basis used in CSI-RS precoding corresponds to the entire bandwidth. $W_D[n] = [s_{i_1}f^*_{nj_1} \cdots s_{i_p}f^*_{nj_p}]$, $n=0,1,\ldots N_3-1$ from which the UE processes the effective DL channel over the entire BW to obtain a wideband precoder. For frequency dependent resource allocation, however, scheduler only needs CSI reports from subsets of bandwidth. In the example of FIG. 6, consider scheduling two UEs in $N_3=8$ subbands, where UE1 is expected to report CSI for first 4 subbands and UE2 is expected to report CSI for the last 4 subbands. By SD-FD precoding of a P port CSI-RS for each UE, CSI-RS overhead is 2P CSI-RS ports in each frequency unit (subband/RB/ . . . ). To avoid this, base station can use the number of non-zero bits in the 5G NR RRC parameter "csi-ReportingBand" field (denote this number by $N_C$) to compute the FD basis vectors. That is, base station can compute FD basis vectors of length $N_C$. This FD basis vector is used to precode CSI-RS in the corresponding $N_C$ subbands. The UE can decode the "csi-ReportingBand" field to process the effective downlink channel and compute and report a wideband precoder for the corresponding $N_C$ subbands.

For example, consider $N_3=8$, $$N_c = 4 = \frac{N_3}{2}.$$

The antenna-to-beam transform $W_{SD} \in \mathbb{C}^{N_T \times K_S}$ is obtained from the UL channel estimate by the BS. Denote the estimated UL channel at the BS from $1^{st}$ 4 subbands as $$H_1 = [H_{UL}[0]H_{UL}[1]H_{UL}[2]H_{UL}[3]] \in \mathbb{C}^{N_R \times 4N_T}$$

For these 4 subband channels, BS finds the dominant DFT FD bases $W_{FD}^{(1)} \in \mathbb{C}^{4 \times K_F}$. The overall transform from the antenna-frequency domain to beam-delay domain for the first 4 subbands is $W_D^{(1)} = W_{FD}^{(1)*} \otimes W_{SD} \in \mathbb{C}^{4N_T \times P}$, where $P = K_S K_F$. $W_D^{(1)}$ can be written as:

$$W_D^{(1)} = \begin{bmatrix} w_D^{(1)}[0] \\ w_D^{(1)}[1] \\ w_D^{(1)}[2] \\ w_D^{(1)}[3] \end{bmatrix} \in \mathbb{C}^{4N_T \times P}$$

and each $W_D^{(1)}[n] \in \mathbb{C}^{N_T \times P}$ is used to precode a P port CSI-RS in subband n=0,1,2,3. Denote the estimated UL channel at the BS from last 4 subbands as:

$$H_2 = [H_{UL}[4]H_{UL}[5]H_{UL}[6]H_{UL}[7]] \in \mathbb{C}^{N_R \times 4N_T}$$

For these 4 subband channels, BS finds the dominant DFT FD bases $W_{FD}^{(2)} \in \mathbb{C}^{4 \times K_F}$. The overall transform from the antenna-frequency domain to beam-delay domain for the last 4 subbands is $W_D^{(2)} = W_{FD}^{(2)*} \otimes W_{SD} \in \mathbb{C}^{4N_T \times P}$. Similar to before, each $W_D^{(2)}[n]531\ \mathbb{C}^{N_T \times P}$ is used to precode a P port CSI-RS in subband n=4,5,6,7.

At the UEs, the DL beam-delay channel corresponding to first and last 4 subbands is estimated respectively by:

$$H_1^{bd} = \Sigma_{n=0}^{3} H[n] W_D^{(1)}[n] \in \mathbb{C}^{N_R \times P}$$

$$H_2^{bd} = \Sigma_{n=4}^{7} H[n] W_D^{(2)}[n] \in \mathbb{C}^{N_R \times P}$$

This is equivalent to the UEs approximating the first and last 4 subbands each by a wideband channel. The P×R precoders $W_{(1)}$ and $W_{(2)}$ corresponding to the first and last 4 subbands are obtained from the corresponding channels $H_1^{bd}$ and $W_2^{bd}$. The subband CQIs are found as:

$$f(H[n]W_D^{(1)}[n]W_{(1)})\text{ for n=0,1,2,3}$$

$$f(H[n]W_D^{(2)}[n]W_{(2)})\text{ for n=4,5,6,7}$$

The UEs reports precoders $W_{(1)}$, $W_{(2)}$, rank indicator R, and subband CQIs found above to the BS. The BS reconstructs the subband PMIs for data transmission as:

$$W_D^{(1)}[n]W_{(1)}\text{ for n=0,1,2,3}$$

$$W_D^{(2)}[n]W_{(2)}\text{ for n=4,5,6,7}$$

By this approach, CSI-RS overhead is reduced to P in each frequency unit.

Figure 7:
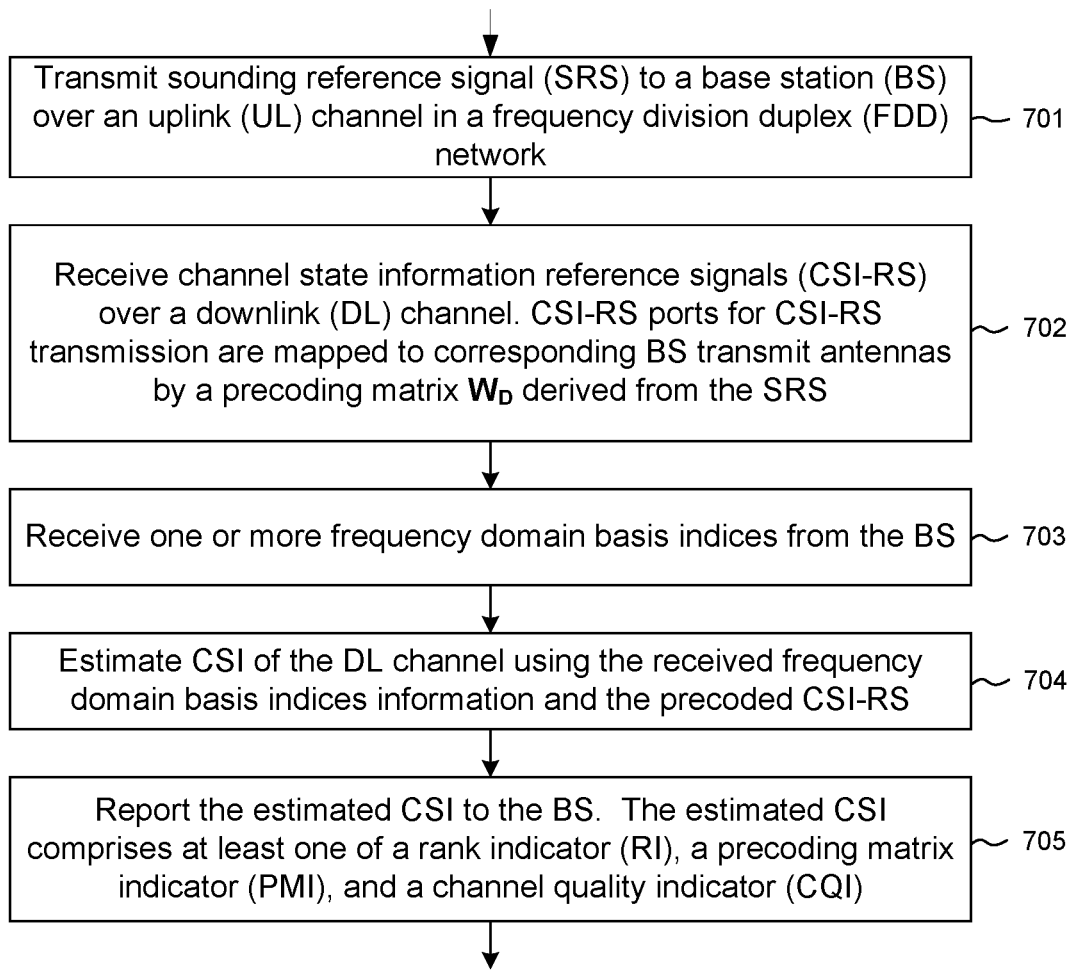
FIG. 7 is a flow chart of method of CSI acquisition and reporting from UE perspective in accordance with one novel aspect.

FIG. 7 is a flow chart of method of CSI acquisition and reporting from UE perspective in accordance with one novel aspect. In step 701, a UE transmits sounding reference signal (SRS) to a base station (BS) over an uplink (UL) channel in a frequency division duplex (FDD) network. In step 702, the UE receives channel state information reference signals (CSI-RS) over a downlink (DL) channel. CSI-RS ports for CSI-RS transmission are mapped to corresponding BS transmit antennas by a precoding matrix $W_D$ derived from the SRS. In step 703, the UE receives one or more frequency domain basis indices from the BS. In step 704, the UE estimates CSI of the DL channel using the received frequency domain basis indices information and the precoded CSI-RS. In step 705, the UE reports the estimated CSI to the BS for subsequent DL transmission. The estimated CSI comprises a rank indicator (RI), a precoding matrix indicator (PMI), and a channel quality indicator (CQI).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
transmitting sounding reference signal (SRS) to a base station (BS) by a user equipment (UE) over an uplink (UL) channel in a frequency division duplex (FDD) network;
receiving channel state information reference signals (CSI-RS) over a downlink (DL) channel, wherein CSI-RS ports for CSI-RS transmission are mapped to corresponding BS transmit antennas by a precoding matrix $W_D$;
receiving one or more frequency domain basis indices from the BS;
estimating CSI of the DL channel using the received frequency domain basis indices information and the precoded CSI-RS; and
reporting the estimated CSI to the BS for subsequent DL transmission.

2. The method of claim 1, wherein the UE is configured to receive the precoded CSI-RS, wherein the CSI-RS ports that are mapped to the corresponding BS transmit antennas by the precoding matrix $W_D$ comprise a subset of spatial domain basis vectors and frequency domain basis vectors derived from SRS.

3. The method of claim 1, wherein the UE receives a downlink signaling comprising the one or more frequency domain basis indices indicating delay offsets with respect to the frequency domain basis vectors in the CSI-RS precoding matrix $W_D$.

4. The method of claim 1, wherein the UE estimates the CSI by reconstructing the DL channel using the precoded CSI-RS and the received frequency domain basis indices information.

5. The method of claim 1, wherein the UE reports the estimated CSI that comprises at least one of a rank indicator, a precoding matrix indicator, and a channel quality indicator, to the BS.

6. The method of claim 1, wherein the UE is configured to measure the precoded CSI-RS and estimate the CSI for a subset of a signaling bandwidth of the DL channel.

7. A User Equipment (UE) comprising:
a transmitter that transmits sounding reference signal (SRS) to a base station (BS) over an uplink (UL) channel in a frequency division duplex (FDD) network;
a receiver that receives channel state information reference signals (CSI-RS) over a downlink (DL) channel, wherein CSI-RS ports for CSI-RS transmission are mapped to BS transmit antennas by a precoding matrix $W_D$, and wherein the receiver further receives one or more frequency domain basis indices from the BS;
a channel estimation circuit that estimates CSI of the DL channel using the received frequency domain basis indices information and the precoded CSI-RS; and
a control circuit that reports the estimated CSI to the BS for subsequent DL transmission.

8. The UE of claim 7, wherein the UE is configured to receive the precoded CSI-RS, wherein the CSI-RS ports that are mapped to the corresponding BS transmit antennas by the precoding matrix $W_D$ comprise a subset of spatial domain basis vectors and frequency domain basis vectors derived from the SRS.

9. The UE of claim 7, wherein the UE receives a downlink signaling comprising the one or more frequency domain basis indices indicating delay offsets with respect to the frequency domain basis vectors in the CSI-RS precoding matrix $W_D$.

10. The UE of claim 7, wherein the UE estimates the CSI by reconstructing the DL channel using the precoded CSI-RS and the received frequency domain basis indices information.

11. The UE of claim 7, wherein the UE reports the estimated CSI that comprises at least one of a rank indicator, a precoding matrix indicator, and a channel quality indicator, to the BS.

12. The UE of claim 7, wherein the UE is configured to measure the precoded CSI-RS and estimate the CSI for a subset of a signaling bandwidth of the DL channel.

13. A method comprising:
receiving sounding reference signal (SRS) from a user equipment (UE) over an uplink (UL) channel by a base station (BS) in a frequency division duplex (FDD) network;
constructing and transmitting channel state information reference signals (CSI-RS) to the UE over a downlink (DL) channel, wherein CSI-RS ports are mapped to BS transmit antennas by a precoding matrix $W_D$;
providing one or more frequency domain basis indices to the UE; and
receiving estimated CSI of the DL channel from the UE and determining subsequent downlink transmission, wherein the received CSI is estimated using the one or more frequency domain indices.

14. The method of claim 13, wherein the CSI-RS ports that are mapped to the BS transmit antennas by the precoding matrix $W_D$ comprise a subset of spatial domain basis vectors and frequency domain basis vectors derived from the SRS.

15. The method of claim 13, wherein the one or more frequency domain basis indices representing delay offsets with respect to frequency domain basis vectors in the CSI-RS precoding matrix $W_D$.

16. The method of claim 13, wherein the CSI is estimated by reconstructing the DL channel using the precoded CSI-RS and the received frequency domain basis indices information.

17. The method of claim 13, wherein the BS receives the estimated CSI of the DL channel from the UE, wherein the estimated CSI comprises at least one of a rank indicator (RI), a precoding matrix indicator (PMI), and a channel quality indicator (CQI).

18. The method of claim 13, wherein the BS configures the UE to measure the precoded CSI-RS and estimate the CSI for a subset of a signaling bandwidth of the DL channel.

\* \* \* \* \*